United States Patent [19]

Morita et al.

[11] Patent Number: 4,915,867

[45] Date of Patent: Apr. 10, 1990

[54] LIQUID CRYSTAL HIGH MOLECULAR MATERIAL

[75] Inventors: Kazuharu Morita; Satoshi Hachiya, both of Chiba, Japan

[73] Assignee: Idemtsu Kosan Company Limited, Tokyo, Japan

[21] Appl. No.: 199,409

[22] PCT Filed: Jul. 16, 1987

[86] PCT No.: PCT/JP87/00521

§ 371 Date: Mar. 17, 1988

§ 102(e) Date: Mar. 17, 1988

[87] PCT Pub. No.: WO88/00606

PCT Pub. Date: Jan. 28, 1988

[30] Foreign Application Priority Data

Jul. 18, 1986 [JP] Japan ................. 61-169288

[51] Int. Cl.$^4$ ............................................. C09K 19/54
[52] U.S. Cl. ........................... 252/299.5; 252/299.01; 252/299.65; 252/299.66; 252/299.67; 252/299.63; 428/1; 350/350 S
[58] Field of Search ........... 252/299.5, 299.01, 299.65, 252/299.66, 299.67, 299.63; 428/1

[56] References Cited

U.S. PATENT DOCUMENTS 4,434,262  2/1984  Buckley .............................. 524/237

FOREIGN PATENT DOCUMENTS 3324770   1/1984  Fed. Rep. of Germany .
58-091759 5/1983  Japan .
61-037892 2/1986  Japan .
61-047427 3/1986  Japan .
61-060734 3/1986  Japan .

OTHER PUBLICATIONS

Finkelman, H. in Thermotropic Liquid Crystals, Gray, G. W., ed. Wiley, Chichester, 1987, Chapter 6.
Shibaev, V. P.; Platé, N. A. in Advances in Polymer Science, 60/61, Gordon, M., ed. Springer-Verlag, Berlin, 1984, p. 173.
Patent Abstracts of Japan, vol. 7, No. 122 (C-168) [1267], May 26th, 1983; & JP-A-58 42 685 (Kogyo Gijutsuin (Japan)) 12-03-1983.
Patent Abstracts of Japan, vol. 12, No. 110 (C-486) [2957], Apr. 8th, 1988; & JP-A-62 238 243 (Idemitsu Kosan Co. Ltd.) 19-10-1987.
Chemical Abstracts, vol. 73, 1970, p. 7, Abstract Nos. 120985d, 120986e, Columbus, Ohio, U.S.; E. Wolfram et al.: "Interaction Between Poly(Vinyl Alcohol) (PVA) and Aliphatic Alcohols of Low Molecular Weight, I. Viscometric Study of Dilute Solutions", & Ann. Univ. Sci. Budapest, Rolando Eotvos Nominatae, Sect. Chim. 1969, 11, 57-62,63-71.

*Primary Examiner*—Teddy S. Gron
*Assistant Examiner*—Richard Treanor
*Attorney, Agent, or Firm*—Armstrong, Nikaido, Marmelstein, Kubocik & Murray

[57] ABSTRACT

This invention comprises a liquid crystalline high molecular weight polymer material which comprises the hydrogen bonded reaction product of a non-liquid crystalline polymer having a proton donor and/or a proton acceptor and a low molecular weight compound having bonded in the molecule respectively a proton acceptor and/or a proton donor which can be bond to said proton donor and/or proton acceptor respectively through hydrogen bonding and having liquid crystallinity. This material forms a smectic phase at a lower temperature than a simple mixture and has usefulness in the field of optical electronics.

8 Claims, No Drawings

LIQUID CRYSTAL HIGH MOLECULAR MATERIAL

TECHNICAL FIELD

This invention relates to a liquid crystalline polymer and more particularly, to a liquid crystal high molecular weight polymer which can be readily obtained by merely mixing a low molecular weight compound and a high molecular weight compound and in which said low molecular weight compound is uniformly distributed in a matrix of the high molecular weight compound, suitably a polymer.

BACKGROUND TECHNIQUE

Hitherto, various liquid crystals of low molecular weight compounds have been known, but they are less than fully satisfactory because being made of low molecular weight compounds, they are inferior in their ability to retain their shape (generally including the properties of liquid crystal compound capable of being molded into desired forms).

Therefore, there have been proposed compositions comprising simple mixtures of a high molecular weight compound with liquid crystals of low molecular weight compound or high molecular weight compounds which has a low molecular weight liquid crystal compound thereto through the backbone of the compound, or to a side chain thereof through a covalent linkage, which have improved shape retention properties.

However, since the terminal group of a low molecular weight liquid crystal compound is generally an alkyl group, mixing of a high molecular weight compound with a low molecular weight liquid crystal compound results in a non-uniform mixed state. The low molecular weight liquid crystal is dispersed in discrete areas throughout the high molecular weight compound. Since the liquid crystal compound is not uniformly mixed with the high molecular weight compound, various defects become apparent when the composition is utilized as a liquid crystal. For example, non-uniform distribution of the low molecular weight liquid crystal compound in the matrix of high molecular weight compound causes nonuniform response and deterioration in definition when applied to display elements Moreover when a liquid crystal compound is bonded to a high molecular weight compound through covalent linkage, reaction conditions suitable to such bonding must be achieved and it is not simple to bond a liquid crystal compound to a high molecular weight compound.

The object of this invention is to provide a liquid crystal high molecular weight material which is not a mere mixture of a high molecular weight compound and a low molecular weight liquid crystal compound and further is not one where a high molecular weight compound and a low molecular weight liquid crystal compound are bonded through a covalent linkage.

Another object of this invention is to provide a liquid crystal high molecular weight material which can be produced by the simple operation of mixing.

DISCLOSURE OF THE INVENTION

The gist of this invention, for attaining above objects, is a liquid crystal high molecular weight material, characterized by having liquid crystallinity, and containing a non-liquid crystalline polymer having a proton donor and/or acceptor, and a low molecular weight compound, containing in the molecule, a proton acceptor and/or a proton donor, capable of bonding to said proton donor and/or proton acceptor of the non-liquid crystal polymer which was a liquid crystal without the proton acceptor/donor constituent, bonded together respectively through a hydrogen bond.

The basis of this invention is that a functional group capable of bonding, through a hydrogen bond, is bonded to a low molecular weight liquid crystal compound and the resulting non-liquid crystal compound or liquid crystal compound is mixed with a non-liquid crystalline polymer having a functional group capable of bonding thereto through a hydrogen bond, whereby a liquid crystal high molecular weight material, which is not a mere mixture, is obtained.

It is surprising that a liquid crystal high molecular weight material is obtained by thus bonding a low molecular weight compound, rendered non-liquid crystalline by introduction of a functional group, and a non-liquid-crystal polymer.

Therefore, the non-liquid-crystalline polymer of this invention is required to have a functional group capable of bonding through a hydrogen bond to a functional group in the low molecular weight compound by simply mixing the two.

Generally, the hydrogen bond has a small bond energy, of 2-8 kcal/mol, which is shown diagrammatically, for example, by the following formula with reference to proton donor and a proton acceptor: —OH .. O=C<.

Therefore, such a functional group, capable of bonding through a hydrogen bond, has no special limitation so long as it has a proton donor and/or a proton acceptor and includes, for example, >C=O, —OH, —COOH, —CONH—, —NH$_2$, —CO—O—CO—, etc. In this case, for example, >C=O is a proton acceptor and —OH is a proton donor and —COOH is a group having both proton donor and proton acceptor functions.

As non-liquid crystalline polymers having such functional groups, capable of bonding through a hydrogen bond, mention may be made of, for example, polyacrylic acid, polymethacrylic acid, polyacrylate, polymethacrylate, polyacrylamide, polyvinyl alcohol and its partial hydrolysate, polyester and polyvinyl acetate, etc. Thus, the functional group, capable of bonding through hydrogen bond, may bond to the backbone or to a side chain of the polymers. These non-crystalline polymers may be used singly or in combination of two or more.

Polyacrylic acid and polyvinyl alcohol are preferred among the above exemplified non- liquid-crystalline polymers.

Furthermore, according to this invention, it is desired that the polymerization degree of said non-liquid crystalline polymers is 10-10,000, preferably 100-2,000. When it is less than 10, the liquid crystal high molecular weight material tends to lack shape retention, and when it is more than 10,000, the liquid crystal high molecular material tends to show difficulty in workability.

The low molecular weight compound has a terminal group A, having a proton donor and/or proton acceptor, a cyclic group X, a bridging group Y, and a chiral terminal group Z, and may be represented by the following formula: A—X—Y—Z ----(1).

This terminal group A has no special limitation so long as it has a proton donor and/or a proton acceptor such as, for example, >C=O, —OH, —COOH, —CONH—, —NH$_2$, —CO—O—CO—, etc. A suitable terminal group A can be shown by the following formula:

B—(CH$_2$)$_p$—D—(CH$_2$)$_q$—E— (2)

(wherein B represents —OH, —COOH, —C(CH$_3$)(CH$_2$OH)$_2$ or —C(CH$_3$)(CH$_2$OCOCH$_3$)2, D represents a single bond or —COO—, E represents —COO— or —O—, p comprises an integer of 0–10 and q is 1–20.

The following can be shown as further suitable terminal groups A among those which are useful in said formula (2).

HOOC—CH$_2$CH$_2$—COO—(CH$_2$)$_{12}$—O—
HOOC—CH$_2$CH$_2$—COO—(CH$_2$)$_{11}$—C(=O)—
H$_3$C—C(CH$_2$OH)$_2$—COO—(CH$_2$)$_{12}$—O—
H$_3$C—C(CH$_2$OH)$_2$—COO—(CH$_2$)$_{11}$—C(=O)—O—
HO—C(CH$_2$OH)$_2$—COO—(CH$_2$)$_{12}$—O—
HO—C(CH$_2$OH)$_2$—COO—(CH$_2$)$_{11}$—C(=O)—O—
HO—CH$_2$CH$_2$—COO—(CH$_2$)$_{12}$—O—
HO—CH$_2$CH$_2$—COO—(CH$_2$)$_{11}$—C(=O)—
HOOC(CH$_2$)$_3$COO(CH$_2$)$_6$—O—
HO—(CH$_2$)$_{12}$—O—
HOOC(CH$_2$)$_8$C(=O)—O—

As the cyclic group X, the following can be enumerated as examples thereof.

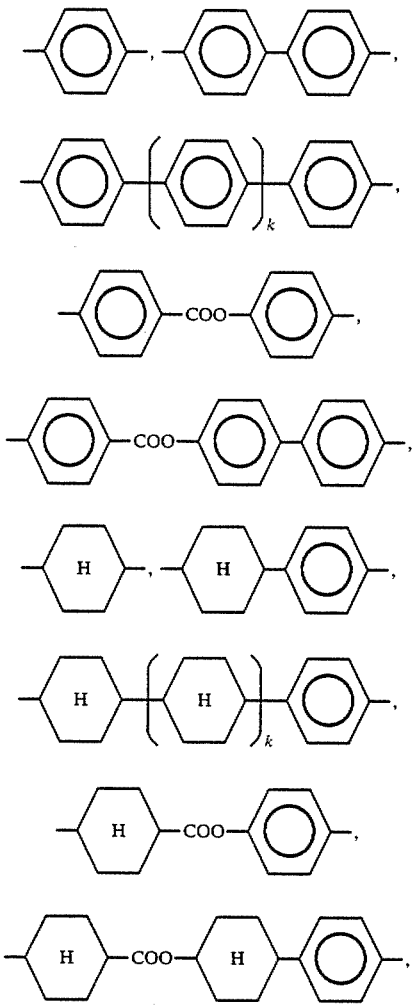

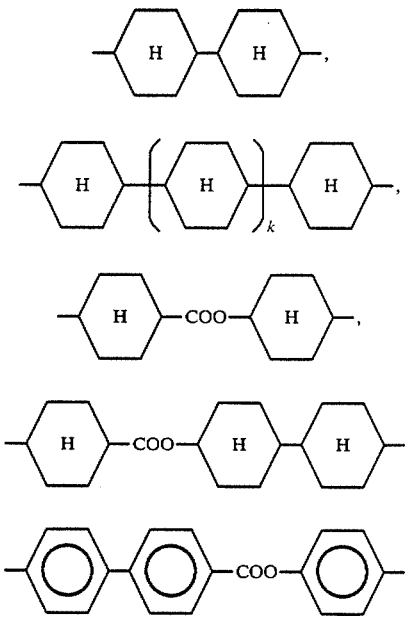

(in the above formulas, k represents an integer of about 1 or 2

Phenylene groups and biphenylene groups are especially preferred among these cyclic groups X.

As said bridging group Y, mention may be made of, for example, —O—, —COO—, —OCO—, —CO—S—, —CH=C(CN)—, —CH=CH—, —CO—CH$_2$—, etc.

—COO—, is preferred among these bridging groups Y.

The chiral terminal group Z is represented by the following formula:

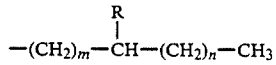

(wherein R represents a lower alkyl group, a halogen atom or a nitrile group, m represents an integer of 0–5 and n represents 0 or 1.) and as examples thereof, mention may be made of 1-methylpropyl group, 2-methylbutyl group, 1-methylbutyl group, 3-methylpentyl group, 2-methylpentyl group, 4-methylhexyl group, 2-chloropropyl group, 2-chlorobutyl group, 3-chlorobutyl group, 3-chloropentyl group, 4-chlorohexyl group, 4-choropentyl group, 2-cyanopropyl group, 2-cyanobutyl group, 3-cyanobutyl group, 3-cyanopentyl group, 4-cyanopentyl group, 4-cyanohexyl group, etc.

Among these groups, the 2-methylbutyl group is preferred.

The liquid crystal high molecular weight material of this invention can be produced by mixing said specific non-liquid crystalline polymer and said low molecular weight compound.

Theoretically, this liquid crystal high molecular weight material can be produced by mixing the non-liquid crystalline polymer with low molecular weight compound. wherein both have about the same number of functional groups capable of hydrogen bonding together. As a practical matter, in order to obtain a high molecular weight material capable of developing liquid crystallinity, for example, when the non-liquid crystalline polymer is polyacrylic acid or polyvinyl alcohol and the terminal group A of the low molecular weight compound has one —COOH or two hydroxyl groups, the polyacrylic acid or polyvinyl alcohol has 1–5 mols, preferably 1.5–4.5 mols of functional groups per one mol of functional group in the low molecular weight compound which is capable of hydrogen bonding.

Mixing of the non-liquid crystalline polymer and the low molecular weight compound can be carried out by optional methods, for example, by mixing a solution of the non-liquid crystalline polymer in a polar solvent with a solution of the low molecular weight compound in a polar solvent, concentrating and drying the mixture.

As the polar solvents, mention may be made of lower alcohols such as methanol, ethanol, etc., ketones such as acetone, methyl ethyl ketone, etc. and halogenated hydrocarbons such as methylene chloride, chloroform, etc.

No special heating is required for the mixing.

After concentration, the concentrated liquid is cast in a suitable mold and dried to obtain a sheet or film of desired thickness and shape or a bulk product of the desired shape.

The shape of the liquid crystal high molecular weight material of this invention depends on the use to which this liquid crystal high molecular weight material will be put.

The thus obtained liquid crystal high molecular weight material is not a mere mixture of non-liquid crystalline polymer and low molecular weight compound, but is a material where the low molecular weight compound bonds to the functional group in the non-liquid crystalline polymer through hydrogen bonding.

Therefore, in this liquid crystal high molecular weight material, non-liquid crystalline or liquid crystalline low molecular weight compound is uniformly dispersed in high molecular weight matrix and even if the low molecular weight compound is non-liquid crystalline, the product material can sufficiently exhibit the characteristics of a liquid crystal and evenly respond to electrical or optical input.

THE BEST MODE FOR PRACTICE OF THE INVENTION

EXAMPLES 1 AND 2

Using Dienstark apparatus, 93 mmols (20 g) of 4'-hydroxybiphenyl-4-carboxylic acid and 467 mmols (41 g) of (S)-(-)-2-methyl butanol were refluxed in 150 ml of benzene for 25 hours in the presence of concentrated sulfuric acid (2 ml).

The react ion mixture was concentrated and thereafter was recrystallized from toluene-hexane mixed solvent to obtain 26.0 g of 4-hydroxybiphenyl-4-carboxylic acid 2-methylbutyl ester (ester 1a) (yield; 98%, $[\alpha]^{23}D - +4.85$ (chloroform)).

63 mmols (18 g) of said ester 1a, 37.7 mmols (10 g) of 12-bromo-1-dodecanol and 151 mmols (20.8 g) of potassium carbonate were refluxed in 400 ml of acetone for 8 hours.

The reaction mixture was filtered and the filtrate was concentrated, then purified by column chromatography and recrystallized from ethanol to obtain 17.7 g of 4'-(12-hydroxydodecyloxy)biphenyl-4-carboxylic acid 2-methylbutyl ester {ether 1, $[\alpha]^{23}D = +2.91$ (chloroform)} (yield 58%).

21.8 mmols (10.2 g) of said ether 1b and 23.9 mmols (2.4 g) of succinic anhydride were refluxed in a mixed solvent of 50 ml of pyridine and 30 ml of chloroform for 5 hours.

The reaction mixture was washed with dilute hydrochloric acid, washed with water, dried and then recrystallized from ethanol to obtain 7.1 g (yield 57%) of the desired non-liquid crystalline low molecular weight compound 4'{12-( 3 -carboxypropionyloxy)dodecyloxy}biphenyl-4-carboxylic acid 2-methylbutyl ester (non-liquid crystalline low molecular weight compound 1c, melting point 78.8°–80.0° C., $[\alpha]23 D = +2.16$ (chloroform)}.

A solution of 2.4 g of said non-liquid crystalline low molecular weight compound 1c in 500 ml of acetone was mixed with a solution of 0.91 g of polyacrylic acid in 500 ml of ethanol (said polyacrylic acid had Mw of 250,000 and Tg of 106° C. in Example 1 and Mw of 7,000 and Tg of 106° C. in Example 2). The mixture was well stirred, concentrated and then dried to obtain 2 kinds of liquid crystal high molecular weight films.

Phase transition behaviors with temperatures of these liquid crystal high molecular weight films and said non-liquid crystalline low molecular weight compound 1c are shown in Table 1.

EXAMPLE 3

63 mmols (18 g) of the ester 1a obtained in Examples 1 and 2, 0.12 mol (39.4 g) of dibromododecane and 0.25 mol (34.6 g) of potassium carbonate were refluxed in 600 ml of acetone for 8 hours. The reaction mixture was filtered and the filtrate was concentrated, purified by column chromatography and recrystallized from ethanol to obtain 21.8 g (yield 65%) of 4'-12-bromodoecyloxy) biphenyl-4-carboxylic acid 2-methylbutyl ester {monobromo compound 1d, $[\alpha]^{23}D = +2.85$ (chloroform)}.

60.0 mmols of 2,2-dihydroxymethylpropionic acid and 66.0 mmols of tetramethylammonium hydroxide (pentahydrate) were stirred in 300 ml of DMF for 2 hours.

Then, thereto was added 85.0 mmols of said monobromo compound 1d and the mixture was stirred for 6 hours. The reaction mixture to which 1 l water was added was extracted with ether, dried, concentrated and purified by column chromatography to obtain the desired 4'-(12-(2,2-dihydroxymethylpropionlyloxy)-dodecyloxy)biphenyl-4-carboxylic acid 2-methybutyl ester (liquid crystalline low molecular weight compound 3a) {yield 50%, $[\alpha]^{23}D = +2.11$ (chloroform)].

A solution of 2.4 g of said liquid crystalline low molecular weight compound 3a in 500 ml of acetone was mixed with a solution of 0.89 g of polyacrylic acid (Mw: 7,000, glass transition temperature: 106° C.) in 500 ml of ethanol and the mixture was well stirred, concentrated and dried to obtain a liquid crystal high molecular film.

Phase transition behavior with temperatures of this liquid crystal film and said liquid crystalline low molecular weight compound 3a are shown in Table 1.

EXAMPLE 4

A solution of 2.4 g of the same non-liquid crystalline low molecular weight compound 1c as used in Examples 1 and 2 in 500 ml of acetone was mixed with a solution of 0.56 g of polyvinyl alcohol(Mw: 70,000 and glass transition temperature: 85° C.) in 500 ml of ethanol. The mixture was well stirred, concentrated and then dried to obtain a liquid crystal high molecular weight film.

Phase transition behaviors with temperature of said liquid crystal high molecular weight film and the non-liquid crystalline low molecular weight compound 1c are shown in Table 1.

TABLE 1

| Example | Polymer (b) Kind | Polymer (b) Terminal group capable of bonding through hydrogen bond | Low molecular weight compound Kind | Amounts | Phase transition behavior (a) After blending polymer (b) | Phase transition behavior (a) Low molecular compound blending with polymer (b) |
|---|---|---|---|---|---|---|
| 1 | I | 3 mol | HOOC—CH$_2$CH$_2$—COO$\leftarrow$CH$_2$$\rightarrow_{\overline{12}}$O—⟨○⟩—⟨○⟩—COO—CH$_2$—$\overset{*}{\text{CH}}$—C$_2$H$_5$ $\;\;\;\;\;\;\;$ | CH$_3$ (non-liquid crystalline) | 1 mol | Gls $\underset{64.0}{\overset{76.0}{\rightleftarrows}}$ SA $\underset{70}{\overset{\;\;}{\rightleftarrows}}$ Iso | Cry $\underset{70}{\overset{79}{\rightleftarrows}}$ Iso |
| 2 | II | 3 mol | HOOC—CH$_2$CH$_2$—COO$\leftarrow$CH$_2$$\rightarrow_{\overline{12}}$O—⟨○⟩—⟨○⟩—COO—CH$_2$—$\overset{*}{\text{CH}}$—C$_2$H$_5$ $\;\;\;\;\;\;\;$ | CH$_3$ (non-liquid crystalline) | 1 mol | Gls $\underset{62.5}{\overset{76.5}{\rightleftarrows}}$ SA $\underset{72}{\overset{\;\;}{\rightleftarrows}}$ Iso | Cry $\underset{70}{\overset{79}{\rightleftarrows}}$ Iso |
| 3 | II | 1.5 mol | HOCH$_2$—$\overset{CH_3}{\underset{\overset{*}{\;}}{C}}$—CH$_2$OH $\;\;\;\;\;$ COO$\leftarrow$CH$_2$$\rightarrow_{\overline{12}}$O—⟨○⟩—⟨○⟩—COO—CH$_2$—$\overset{*}{\text{CH}}$—C$_2$H$_5$ (liquid crystalline) | | 1 mol | Gls $\underset{40}{\overset{58}{\rightleftarrows}}$ SA $\underset{85}{\overset{93}{\rightleftarrows}}$ Iso | Cry $\underset{33}{\overset{56}{\rightleftarrows}}$ SA $\underset{77}{\overset{80}{\rightleftarrows}}$ Iso |
| 4 | III | 3 mol | HOOC—CH$_2$CH$_2$—COO$\leftarrow$CH$_2$$\rightarrow_{\overline{12}}$O—⟨○⟩—⟨○⟩—COO—CH$_2$—$\overset{*}{\text{CH}}$—C$_2$H$_5$ $\;\;\;\;\;\;\;$ | CH$_3$ (non-liquid crystalline) | 1 mol | Gls $\underset{65}{\overset{75.8}{\rightleftarrows}}$ SA $\underset{73}{\overset{\;\;}{\rightleftarrows}}$ Iso | Cry $\underset{70}{\overset{79}{\rightleftarrows}}$ Iso |

Gls: Glassy state, Cry: Crystalline state, SA: Smectic state, Iso: Isotropic, THE number indicates temperature (°C.)
I: Polyacrylic acid (Mw = 250,000), II: Polyacrylic acid (Mw = 9,000), III: Polyvinyl alcohol (Mw = 70,000)

EXAMPLE 5

Ester 1a (4'-hydroxybiphenyl-4-carboxylic acid 2-methylbutyl ester was obtained in the same manner as in Example 1.

70 mmols (19.9 g) of said ester 1a, 100 mmols (24.4 g) of 1,6-dibromohexane and 150 mmols (20.7 g) of potassium carbonate were refluxed in 400 ml of acetone for 8 hours. The reaction mixture was filtered and then purified by column chromatography to obtain 4'-(6-bromohexyloxy)biphenyl-4-carboxylic acid 2-methylbutyl ester (ether 5b; 18.9 g, yield 60%, $[\alpha]^{23}D = +2.93$ (chloroform)).

Then, a solution of 40 mmols (5.3 g) of glutaric acid and 80 mmols (14.4 g) of tetramethylammonium hydroxide (pentahydrate) in 100 ml of DMF was stirred for 2 hours. Thereto was added dropwise a solution of 20 mmols (8.9 g) of the ether obtained above in DMF, followed by stirring for 8 hours. The reaction mixture was extracted with ether, concentrated and then purified by column chromatography to obtain 4'-[6-(3-carboxybutanoyloxy) hexyloxy]biphenyl-4-carboxylic acid 2-methylbutyl ester (liquid crystalline low molecular weight compound 5c: 62 g, yield 62%, $[\alpha]^{23}D = +2.35$ (chloroform)).

A solution of 1.00 g of said liquid crystalline low molecular weight compound 5c in methylene chloride and a solution of 0.52 g of polyvinyl acetate (Mw=250,000, Tg−28° C.) were well stirred, concentrated and then dried to obtain a liquid crystal high molecular weight film.

Phase transition behaviors with temperature of these liquid crystal film and said liquid crystalline low molecular weight compound 5c are shown in Table 2.

EXAMPLE 6

Ether 1b (4'-(12-hydroxydodecyloxy)biphenyl-4-carboxylic acid 2-methylbutyl ester) was obtained in the same manner as in Example 1. A solution of 1.00 g of this ether 1b and 0.55 g of the same polyvinyl acetate as used in Example 5 in methylene chloride was well stirred, concentrated and then dried to obtain a liquid crystal high molecular weight film.

Phase transition behaviors with temperature of this liquid crystalline high molecular weight film and said ether 1b are shown in Table 2.

EXAMPLE 7

A liquid crystalline low molecular weight compound 3a (4'-[12-(2,2-dihydroxymethylpropionyloxy)-dodecyloxy]biphenyl-4-carboxylic acid 2-methylbutyl ester) was obtained in the same manner as in Example 3.

A Solution of 1.00 g of this liquid crystalline low molecular weight compound 3a and 0.59 g of the same polyvinyl acetate as used in Example 5 in methylene chloride was well mixed, concentrated and then dried to obtain a liquid crystalline high molecular weight film.

Phase transition behavior with temperature of this liquid crystalline high molecular weight film and said liquid crystalline low molecular weight compound 3a are shown in Table 2.

EXAMPLE 8

(8-1) Synthesis of 4'-hydroxybiphenyl-4-carboxylic acid 2-methylbutyl ester

The objective ester 1a was obtained in the same manner as in Example 1.

(8-2) Synthesis of 4-benzyloxycarbonyloxybenzoic acid 65 mmols (11.1 g) of benzyloxycarbonyl chloride was added dropwise to a solution of 55 mmols (7.4 g) of 4-hydroxybenzoic acid and 65 mmols (2.6 g) of sodium hydroxide in 200 ml of water at ice point. The reaction mixture was stirred for 24 hours and the precipitate was filtered, washed, dried and then purified by column chromatography to obtain the objective carbonic acid ester carboxylic acid 8b. (14.8 g. yield 99%)

(8-3) Synthesis of 4-benzyloxycarbonyloxybenzoic acid chloride

A solution of 27 mmols (7.3 g) of the carbonic acid ester carboxylic acid 8b obtained in the above (8-2) and 27 mmols (56 g) of phosphorus pentachloride in 50 mmols of ether was stirred at room temperature for 24 hours. After the reaction, removal of ether was effected and the resulting crystal was recrystallized from hexane to obtain the objective acid chloride 8c. (6.4 g, yield 82%)

(8-4) Synthesis of 4'-(4''-benzyloxycarbonyloxybenzoyloxy)-biphenyl-4-carboxylic acid 2-methylbutyl ester A solution of 16 mmols (4.5 g) of the ester 1a obtained in the above (8-1) and 16 mmols (1.6 g) of triethylamine in 20 ml of THF was stirred at ice point, followed by adding dropwise a solution of 15 mmols (4.4 g) of the acid chloride 8c obtained in the above (8-3) in THF. The solution was stirred for 8 hours while gradually returning the temperature to room temperature. The reaction mixture was extracted with ether, dried, concentrated and then purified by column chromatography to obtain the objective ester 8d. (6.5 g, yield 81%, $[\alpha]^{23}D = +2.25$ (chloroform)).

(8-5) Synthesis of 4'-(4''-hydroxybenzoyloxy)biphenyl-4-carboxylic acid 2-methylbutyl ester A solution of 10 mmols (5.4 g) of the ester 8d obtained in the above (8-4) and 0.4 g of palladium carbon (5% catalyst) in 40 ml of ethyl acetate was reacted for 4 hours in a hydrogen gas atmosphere. The reaction mixture was filtered, concentrated and then purified by column chromatography to obtain the objective hydroxy ester 8e. (3.9 g, yield 96%, $[\alpha]^{23}D = +2$ 11 (chloroform)).

(8-6) Synthesis of 4'-[4''-(12-bromodoecanoyloxy)benzoyloxy]-biphenyl-4-carboxylic acid 2-methylbutyl ester A solution of 8 mmols (2.2 g) of 12-bromododecanoic acid and 10 ml of toluene in 5 ml of thionyl chloride was stirred at 80° C. for 1 hour. Excess thionyl chloride and toluene were distilled out under reduced pressure to obtain acid chloride 8f. A solution of 8 mmols (3.2 g) of the hydroxy ester 8e obtained in the above (8-5) and 10 mmols (1.0 g) of triethylamine in 100 ml of the THF was stirred. A solution of said acid chloride 8f in THF was added dropwise thereto followed by stirring for 8 hours. The reaction mixture was extracted with ether, washed with an aqueous dilute hydrochloric acid solution, dried, concentrated and then purified by column chromatography to obtain the objective bromo ester 8h. (4.6 g, yield 87%, $[\alpha]^{23}D = +2.15$ (chloroform)).

(8-7) Synthesis of 4'-[4"-(12-(2,2-dihydroxymethyloropionyloxy)-dodecanoyloxy) benzoyloxy]biohenyl-4-carboxylic acid 2-methylbutyl ester 10 mmols (1.3 g) of 2,2-dihydroxymethylpropionic acid and 10 mmols (1.8 g) of tetramethylammonium hydroxide (pentahydrate) were stirred in 100 ml of DMF for 2 hours. Then, thereto was added 6 mmols (4.0 g) of the bromo ester 8h obtained in the above (8-6), followed by stirring for 8 hours. The reaction mixture was extracted with ether, dried, concentrated and then purified by column chromatography to obtain the objective ester (liquid crystalline low molecular weight compound 8i) (3.1 g, yield 71%, $[\alpha]^{23}D = +2.29$ (chloroform)).

(8—8) Production of a liquid crystalline high molecular film 1.00 g of said liquid crystalline low molecular weight compound 8i and a solution of 0.48 g of the same polyvinyl acetate as used in Example 5 in methylene chloride were well stirred, concentrated and dried to obtain a liquid crystalline high molecular weight film. Phase transition behavior with temperature of this liquid crystalline high molecular weight film and said liquid crystalline low molecular weight compound 8i are shown in Table 2.

EXAMPLE 9

(9-1) Synthesis of 4-hydroxybenzoic acid 2-methylbutyl ester 90 mmols (12.2 g) of 4-hydroxybenzoic acid and 360 mmols (31.7 g) of 2-methyl butanol were subjected to dehydration reaction in 150 ml of toluene in the presence of 2 ml of concentrated sulfuric acid in a mixture determination tube for 25 hours. The reaction mixture was concentrated and then purified by column chromatography to obtain the objective hydroxy ester 9a (18.7 g, yield 98% $[\alpha]^{23}D = +4.85$ (chloroform)).

(9-2) Synthesis of 4-benzyloxycarbonyloxybenzoic acid

The desired carbonic acid ester carboxylic acid 8b was obtained in the same manner as in (8-2) of Example 8.

(9-3) Synthesis of 4-benzyloxycarbonyloxybenzoic acid chloride

The desired acid chloride 8c was obtained in the same manner as in (8-3) of Example 8.

(9-4) Synthesis of 4-(4'-(benzyloxycarbonyloxy)benzoyloxy) benzoic acid 2-methylbutyl ester A solution of 60 mmols (12.5 g) of hydroxy ester 9a obtained in the above (9-1) and 70 mmols (7.1 g) of triethylamine in 40 ml of THF was stirred and 60 mmols (17.4 g) of the acid chloride 8c obtained in the above (9-3) was added dropwise thereto, followed by stirring for 8 hours. The reaction mixture was extracted with ether, dried, concentrated and then purified by column chromatography to obtain the desired carbonic acid ester 9b (20.3 g, yield 73% $[\alpha]^{23}D = +2.64$ (chloroform)).

(9-5) Synthesis of 4-(4'-hydroxybenzoyloxy) benzoic acid 2-methylbutyl ester

A dispersion solution of 30 mmols (13.9 g) of the carbonic acid ester 9b obtained in the above (9-4) was reacted with 9.8 g of palladium carbon catalyst (5% pd) in 200 ml of ethyl acetate for 4 hours in a hydrogen gas atmosphere. The reaction mixture was filtered and concentrated and then purified by column chromatography to obtain the desired hydroxy ester 9c (9.6 g, yield 97% $[\alpha]^{23}D = +2.45$ (chloroform)).

(9-6) Synthesis of 4-[4'-(12-bromododecanoyloxy)benzoyloxy]-benzoic acid 2-methylbutyl ester A solution of 30 mmols (8.4 g) of 12-bromododecanoic acid and 10 ml of toluene in 5 ml of thionyl chloride was stirred at 80° C. for 1 hour. Excess thionyl chloride and toluene were distilled out under reduced pressure to obtain 12-bromododecanoyl chloride(acid chloride 9d). A solution of 25 mmols (8.2 g) of hydroxy ester 9c obtained in the above (9-5) was stirred with 30 mmols (3.0 g) of triethylamine in 100 ml of THF. A solution of said acid chloride 9c in THF, was added dropwise thereto followed by stirring for 8 hours. The reaction mixture was extracted with ether, washed with dilute aqueous hydrochloric acid solution, dried, concentrated and then purified by column chromatography to obtain the desired bromo ester 9e (12.1 g, yield 82% $[\alpha]^{23}D = +2 35$ (chloroform)).

(9-7) Synthesis of 4-[4'-{12-(2'2-dihydroxymethylpropionyloxy)dodecanolyloxy} benzoyloxy]benzoic acid 2-methylbutylester 25 mmols (3.4 g) of 2,2-dihydroxymethylpropionic acid and 25 mmols (4.5 g) of tetramethylammonium hydroxide (pentahydrate) were stirred in 100 ml of DMF for 2 hours. Then, thereto was added 20 mmols (11.8 g) of the bromo ester 9e obtained in the above (9-6) and stirring was effected for 8 hours. After the reaction, the reaction mixture was extracted with ether, dried, concentrated and purified by column chromatography to obtain the objective ester (liquid crystalline low molecular weight compound 9f). (10.9 g, yield 85% $[\alpha]^{23}D = +2.30$ (chloroform)).

(9-8) Production of liquid crystal high molecular weight film

A solution of 1.00 g of said liquid crystalline low molecular weight compound 9f and 0.54 g of the same polyvinyl acetate as used in Example 5 was fully stirred, concentrated and dried to obtain a liquid crystal high molecular weight film.

Phase transition behavior[s] with temperature of this liquid crystal high molecular film and said liquid crystalline low molecular weight compound 9f are shown in Table 2.

EXAMPLE 10

Hydroxy ester 8e (4'-(4"-hydroxybenzoyloxy)biphenyl-4-carboxylic acid 2-methylbutylester) was prepared in the same manner as in (8-1)-(8-5) of Example 8.

Synthesis of 4'-[4"-(9-caroxynonanoyloxy)benzoyloxy]biohenyl-4-carboxylic acid 2-methybutyl ester 30 mmols (7.2 g) of sebacoyl chloride was put in a solution of 10 mmols (4.0 g) of hydroxy ester 8e obtained above and 30 mmols (3.0 g) of triethylamine in THF, followed by stirring for 6 hours. The reaction mixture was extracted with ether, washed with dilute aqueous hydrochloric acid solution, dried, concentrated and then purified by column chromatography to obtain the objective ester (liquid crystalline low molecular weight compound 10a). (1.9 g, yield 32%, $[\alpha]^{23}D = +2.28$ (chloroform)).

Production of liquid crystal high molecular weight film

A solution of 1.00 g of said liquid crystalline low molecular weight compound 10a and 0.44 g of the same polyvinyl acetate as used in Example 5 in methylene chloride was well stirred, concentrated and dried to obtain a liquid crystal high molecular weight film.

Phase transition behaviors with temperature of this liquid crystal high molecular film and said liquid crystalline low molecular weight compound 10a are shown in Table 2.

EXAMPLE 11

(11-1) Synthesis of 4-hydroxybenzoic acid 2-methylbutyl ester

The objective hydroxy ester 9a was obtained in the same manner as in (9-1) of Example 9.

(11-2) Synthesis of 4'-(benzyloxycarbonyloxy)biphenyl-4-carboxylic acid 70 mmols (11.9 g) of benzyloxycarbonyl chloride was added dropwise to an aqueous solution of 60 mmols (12.9 g) of 4'-hydroxybiphenyl-4-carboxylic acid and 70 mmols (2.8 g) of sodium hydroxide in 2 l of water at ice point with stirring. The mixture was stirred for 24 hours and then the precipitate was filtered, washed with water, dried and then purified by column chromatography to obtain the objective carbonic acid ester carboxylic acid 11a (19.4 g, yield 98%).

(11-3) Synthesis of 4'-(benzyloxycarbonyloxy)biphenyl-4-carboxylic acid chloride A solution of 50 mmols (17.4 g) of the carbonic acid ester carboxylic acid 11a and 50 mmols (10.4 g) of phosphorus pentachloride in 300 ml of ether was stirred at room temperature for 24 hours. After the reaction, the reaction mixture was subjected to removal of ether by distillation used reduced pressure to obtain the objective acid chloride 11b (18.1 g, yield 99%).

(11-4) Synthesis of 4-[4''-(benzyloxycarbonyloxy)biohenyl-4'-carbonyloxy]benzoic acid 2-methylbutyl ester A solution of 40 mmols (14.7 g) of the acid chloride 11b obtained in said (11-3) in THF was added dropwise to a solution of 40 mmols (8.3 g) of hydroxy ester 9a obtained in said (11-1) and 50 mmols (5.1 g) of triethylamine in 150 ml of THF with stirring, followed by stirring for 8 hours. After the reaction, the reaction mixture was extracted with ether, dried, concentrated and purified by column chromatography to obtain the objective ester 11c (17.2 g, yield 82% $[\alpha]^{23}D = +2.45$ (chloroform)).

(11-5) Synthesis of 4-(4''-hydroxybiphenyl-4'-carbonyloxy) benzoic acid 2-methylbutyl ester A dispersed solution of 30 mmols (16.2 g) of the ester 11c obtained in said (11-4) and 0.8 g of palladium carbon catalyst (5% Pd) in 60 ml of ethyl acetate was subjected to reaction in a hydrogen atmosphere for 4 hours. After the reaction, the reaction mixture was filtered, concentrated and then purified by column chromatography to obtain the objective hydroxy ester 11d (11.4 g, yield 94%, $[\alpha]^{23}D = +2.35$ (chloroform)).

(11-6) Synthesis of 4-[4''-(12-bromododecanoyloxy)biphenyl -4'-carbonyloxy]benzoic acid-2methylbutyl ester A solution of 30 mmols (8.4 g) of 12-bromododecanoic acid and 10 ml of toluene in 5 ml of thionyl chloride was stirred at 80° C. for 1 hour. Excess thionyl chloride and toluene were distilled out under reduced pressure to obtain 12-bromododecanoyl chloride (acid chloride 11e). 25 mmols (10.1 g) of hydroxy ester 11d obtained in said (11-5) and 30 mmols (3.0 g) of triethylamine were stirred in 100 ml of THF for 2 hours. Thereto was added dropwise a solution of said acid chloride 11e in THF, followed by stirring for 8 hours. The reaction mixture was extracted with ether, washed with dilute aqueous hydrochloric acid solution, dried, concentrated and then purified by column chromatography to obtain the objective bromo ester 11f (13.3 g, yield 80% $[\alpha]^{23}D = +2.29$ (chloroform)).

(11-7) Synthesis of 4-[4''-(12-dihydroxymethylpropionyloxy) dodecanoyloxybiphenyl-4'-carbonyloxy]benzoic acid 2-methylbutyl ester 20 mmols (2.7 g) of 2,2-dihydroxymethylpropionic acid and 20 mmols (3.6 g) of tetramethylammonium hydroxide (pentahydrate) were stirred in 60 ml of DMF for 2 hours. Then, thereto was added 15 mmols (10.0 g) of bromo ester 11f obtained in said (11-6), followed by stirring for 8 hours. After the reaction, the reaction mixture was extracted with ether, dried, concentrated and then purified by column chromatography to obtain the objective ester (liquid crystalline low molecular weight compound 11g) (9.1 g, yield 84%, $[\alpha]^{23}D = +2.11$ (chloroform)).

(11-8) Production of liquid crystal high molecular weight film

A solution of 1.00 g of said liquid crystalline low molecular weight compound 11g and 0.48 g of the same polyvinyl acetate as used in Example 5 in methylene chloride was well stirred, concentrated and dried to obtain a liquid crystal high molecular weight film.

Phase transition behaviors with temperature of this liquid crystal high molecular weight and said liquid crystalline low molecular weight compound 11g are shown in Table 2.

TABLE 2

| Example | Polymer (b) Kind | Polymer (b) Terminal Group Capable of bonding through hydrogen bond | Low molecular weight compound Kind | Amount | Phase transition behavior (a) After blending of polymer (b) | Phase transition behavior (a) Low molecular compound before blending with polymer (b) |
|---|---|---|---|---|---|---|
| IV | IV | 3 mols | (liquid crystalline) HOCO(CH$_2$)$_3$COO(CH$_2$)$_6$O—⟨○⟩—⟨○⟩—COOCH$_2$CH(CH$_3$)C$_2$H$_5$* | 1 mols | Gls $\xrightarrow{54}$ SA $\xrightarrow{61}$ Iso ; ←15, ←58 | Cry $\xrightarrow{56}$ SA $\xrightarrow{61}$ Iso ; ←15, ←58 |
| IV | IV | 3 mols | (liquid crystalline) HO(CH$_2$)$_{12}$O—⟨○⟩—⟨○⟩—COOCH$_2$CH(CH$_3$)C$_2$H$_5$* | 1 mols | Gls $\xrightarrow{73}$ SA $\xrightarrow{78}$ Iso ; ←62, ←76 | Cry $\xrightarrow{74}$ SA $\xrightarrow{79}$ Iso ; ←66, ←78 |
| IV | IV | 2 mols | (liquid crystalline) HOCH$_2$—C(CH$_3$)—CH$_2$OH, COO(CH$_2$)$_{12}$COO—⟨○⟩—COO—⟨○⟩—COO—CH$_2$—CH(CH$_3$)—C$_2$H$_5$* | 1 mols | Gls $\xrightarrow{65}$ SA $\xrightarrow{75}$ Iso ; ←12, ←74 | Cry $\xrightarrow{56}$ SA $\xrightarrow{80}$ Iso ; ←33, ←77 |
| IV | IV | 2 mols | (liquid crystalline) HOCH$_2$—C(CH$_3$)—CH$_2$OH, COO(CH$_2$)$_{12}$COO—⟨○⟩—BP—COO—CH$_2$—CH(CH$_3$)—C$_2$H$_5$* (e) | 1 mols | Gls $\xrightarrow{35}$ SA $\xrightarrow{170}$ Iso ; ←20, ←147 | Cry $\xrightarrow{35}$ SA $\xrightarrow{85}$ Iso ; ←25, ←69 |
| IV | IV | 2 mols | (liquid crystalline) (e) | 1 mols | Gls $\xrightarrow{35}$ SA $\xrightarrow{193}$ Iso ; ←28, ←180 | Cry $\xrightarrow{60}$ SA $\xrightarrow{}$ Iso ; 31, 54 |
| IV | IV | 3 mols | (liquid crystalline) HOCO(CH$_2$)$_8$COO—⟨○⟩—⟨○⟩—COOCH$_2$CH(CH$_3$)C$_2$H$_5$* | 1 mols | Gls $\xrightarrow{71}$ SA $\xrightarrow{125}$ Iso ; ←43, ←120 | Cry $\xrightarrow{88}$ SA $\xrightarrow{119}$ Iso ; ←88, ←118 |
| IV | V | 2 mols | (liquid crystalline) HOCH$_2$—C(CH$_3$)—CH$_2$OH, COO(CH$_2$)$_{12}$COO—BP—COO—CH$_2$—CH(CH$_3$)—C$_2$H$_5$* (e) | 1 mols | Gls $\xrightarrow{32}$ SA $\xrightarrow{181}$ Iso ; ←21, ←149 | Cry $\xrightarrow{35}$ SA $\xrightarrow{85}$ Iso ; ←25, ←68 |

Marks and number have the same meaning as in Table 1
(b): IV: Polyvinyl acetate (Mw = 250,000)

(c): BP: 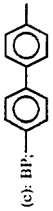

Industrial Applicability

This invention can provide a liquid crystal high molecular weight material which comprises a non-liquid crystalline polymer in which a low molecular weight compound is uniformly distributed.

In the liquid crystal high molecular weight material of this invention, the non-liquid crystalline polymer and the low molecular weight compound are bonded to each other through hydrogen bonding and so can form a smectic phase at a lower temperature than conventional high molecular weight liquid crystal composition in which a non-liquid crystalline polymer and a liquid crystal compound do not bond to each other through hydrogen bonding, but are merely mixed. This makes it possible to use these material in the field of optical electronics, which utilize the characteristics of liquid crystals at a lower temperature.

That is, this liquid crystal high molecular weight material can suitably be applied to optical electronics, namely, electronic optical devices such as room temperature switching elements, display elements for desk calculators and watches, electronic optical shutters, electron optical diaphragms, optical modulation, optical path changeover switches memories, and liquid crystal printer heads.

The liquid crystal high molecular weight material of this invention can be obtained by a simple mixing operation and is superior in shape retention.

We claim:

1. A liquid crystal high molecular weight material comprising the hydrogen bonded product of a non-liquid crystalline polymer having proton transfer functionality selected from a group consisting of polyacrylic acid, polymethacrylic acid, polyacrylate, polymethacrylate, polyacrylamide, polyvinyl alcohol and its partial hydrolysis, and polyvinyl acetate, the polymerization degree of the polymer being 10–10,000; and a low molecular weight compound having the formula A—X—Y—Z, which has proton transfer functionality opposite to and reactive with the proton transfer functionality of said polymer, to produce hydrogen bonding, said low molecular weight compound being at least one compound having a terminal group A having a proton donor and/or a proton acceptor selected from:

$HOOC-CH_2CH_2-COO-(CH_2)_{12}-O-$, $HOOC-CH_2CH_2-COO-(CH_2)_{11}-C(=O)-$, $H_3C-C(CH_2OH)_2-COO-(CH_2)_{12}-O-$, $H_3C-C(CH_2OH)_2-COO-(CH_2)_{11}-C(=O)-O-$, $HO-C(CH_2OH)_2-COO-(CH_2)_{12}-O-$, $HO-C(CH_2OH)_2-COO-(CH_2)_{11}-C(=O)-O-$, $HO-CH_2CH_2-COO-(CH_2)_{12}-O-$, $HO-CH_2CH_2-COO-(CH_2)_{11}-C(=O)-$, $HOOC(CH_2)_3COO(CH_2)_6-O-$, $HO-(CH_2)_{12}-O-$, and $HOOC(CH_2)_8C(=O)-O-$, a cyclic group X selected from:

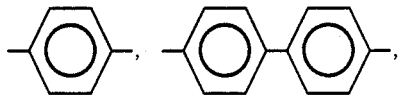

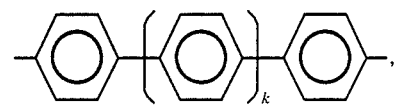

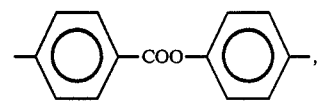

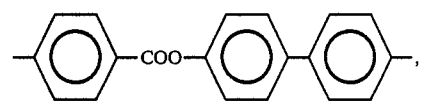

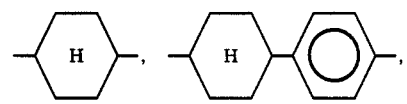

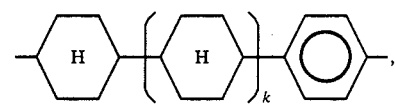

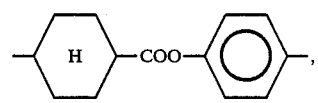

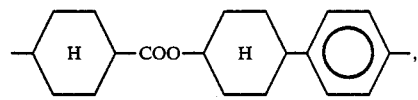

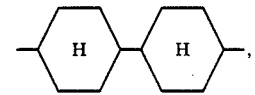

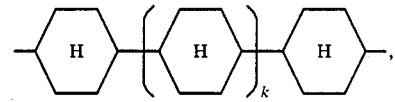

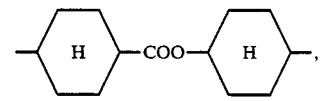

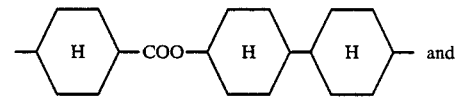 and

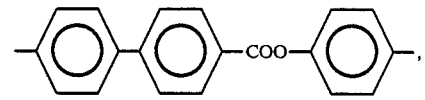

wherein k represents and integer of about 1 or 2, a bridging group Y selected from —O—, —COO—, —OCO—, —CO—S—, —CH=C(CN)—, —CH=CH— and —CO—CH₂—, and a chiral terminal group Z represented by the following formula:

$$-(CH_2)_m-\overset{R}{\underset{|}{CH}}-(CH_2)_n-CH_3$$

wherein R represents a lower alkyl group, a halogen atom or a nitrile group, m represents an integer of 0-5 and n represents 0 or 1, the number of proton transfer functional groups of the low molecular weight compounds being about the same as the number of proton transfer functional groups of the non-liquid crystalline polymer.

2. A liquid crystal high molecular weight material as claimed in claim 1 wherein said polymer contains a proton acceptor and said compound contains a proton donor.

3. A liquid crystal high molecular weight material as claimed in claim 1 wherein said polymer contains a proton donor and said compound contains a proton acceptor.

4. A liquid crystal high molecular weight material according to claim 1 wherein said non-liquid crystalline polymer is at least one of polyacrylic acid, polyvinyl acetate or polyvinyl alcohol.

5. A liquid crystal high molecular weight material according to claim 1 wherein said low molecular weight compound is selected from the group consisting of

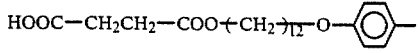

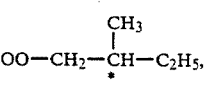

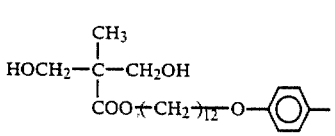

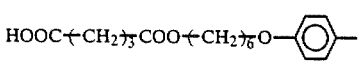

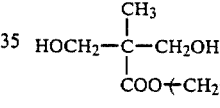

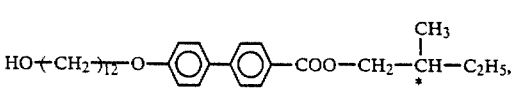

-continued

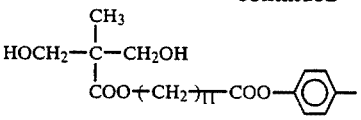

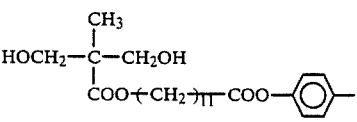

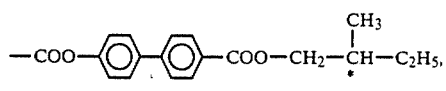

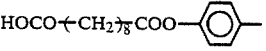

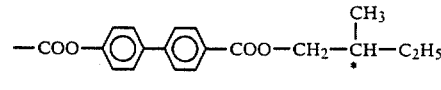

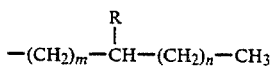

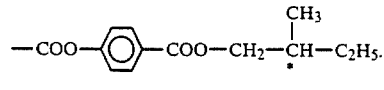

and

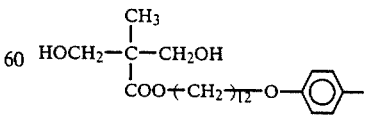

6. A liquid crystal high molecular weight material according to claim 2 wherein said low molecular weight compound is selected from the group consisting of

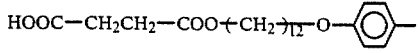

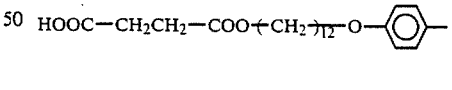

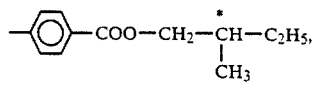

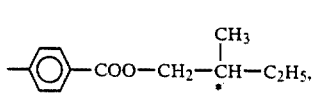

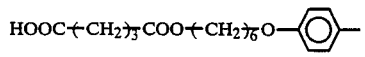
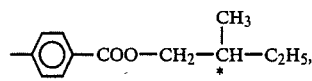
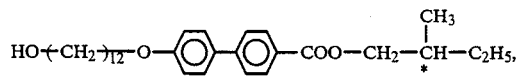
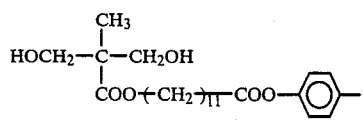
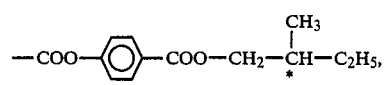
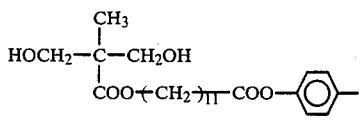
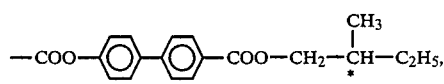
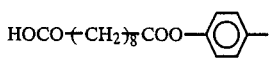
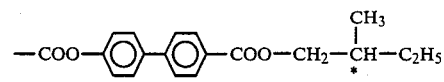
and
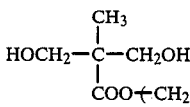
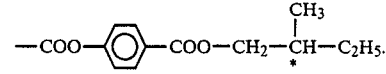
7. A shaped article comprising the materials claimed in claim 1.
8. A material as claimed in claim 1 in the smectic phase.
* * * * *